United States Patent Office 2,906,732
Patented Sept. 29, 1959

2,906,732

METHOD FOR PREPARING AN EXTRUSION MATERIAL FROM HIGH MOLECULAR WEIGHT SYNTHETIC LINEAR SUPERPOLYAMIDES

Jacob C. F. Kessler, Velp, Arnhem, Netherlands, assignor, by mesne assignments, to American Enka Corporation, Enka, N.C., a corporation of Delaware No Drawing. Application September 6, 1955
Serial No. 532,757

Claims priority, application Netherlands
September 16, 1954

3 Claims. (Cl. 260—45.95)

This invention relates to a method for preparing an extrusion material by mixing a granular high molecular weight synthetic linear superpolyamide and a dihydroxybenzene, which material after being melted or softened is destined to be processed to threads and other shaped objects, and to shaped objects manufactured from the extrusion material so prepared.

It is known that the resistance to degradation on exposure to light of superpolyamide threads is improved by the presence of a dihydroxybenzene, such as hydroquinone or catechol.

For many purposes this improvement is only of relatively minor importance, since the phenols in question are relatively soluble in water and are easily removed by washing. However, for certain applications of superpolyamides e.g. for thin coatings on electrical conducting wires and for other shaped objects which are not washed in water, the property of resisting degradation on exposure to light becomes of considerable importance.

Further it has been found that the heat resistance is also improved by the presence of the said dihydric phenols. This is of importance when using superpolyamide threads for textile inlays or cords of motor car tires.

Generally the dihydric phenols are delivered to the extrusion device separately from the grains of high molecular weight synthetic linear superpolyamide, the mixing of these components being effected shortly before melting.

There are certain objections to separate delivery and mixing, as well as in mixing or powdering beforehand, because of the fact that the added substances may be blown away, giving rise to soiling or other inconveniences.

According to the present invention those and other inconveniences and disadvantages are avoided and grains of superpolyamide are prepared in which the dihydroxybenzene is in the interior of the grain.

It is therefore an object of the present invention to make available to the art an extrusion material derived from a granular high molecular weight synthetic linear superpolyamide which will have associated therewith an additive which will improve the resistance to degradation on exposure to light and heat of threads and other shaped objects formed from the thus-treated superpolyamide. Other objects and advantages of the invention will become apparent from the following description.

The method according to the invention is characterized in that the mixture is heated during mixing to a temperature below the melting point of the dihydroxybenzene, but higher than 50° C.

The method may be effected in such a manner that superpolyamide grains are washed and dried in the normal way. After drying and during cooling the selected dihydroxybenzene is added as soon as the temperature is sufficiently low, then mixing is carried out.

Working on in the same equipment, the temperature is increased gradually. Long before the melting point of the dihydroxybenzene component is reached, the latter superficially present on the grains disappears from the grains and probably diffuses via the vapour phase into the superpolyamide at a temperature which lies considerably below the melting point. In the case of e.g. catechol, which is very effective and is the most preferred of the three known dihydroxybenzenes, heating to a temperature of 70° C. is sufficient, while the melting point of catechol is 104° C. and therefore well above satisfactory operating temperatures. Rather early, say after about 30 minutes, no catechol appears to remain on the grains of superpolyamide, and analysis shows that the whole of the catechol has infiltrated the grains. In this manner, a granular anti-oxidant-containing superpolyamide is obtained which may be directly employed as an ejection molding or a spinning material, and wherein the products formed from the molten material, such as threads, films, coatings upon conducting wires, as well as other shaped objects, show a very good heat resistance as well as resistance to light.

The heating of the mixture of ingredients should not be done too quickly, since the superpolyamide absorbs only a certain proportion of the dihydroxybenzene per unit of time. If the heating is done too quickly, the excess dihydroxybenzene deposits on the grains, resulting in an undesirable sticking together of the grains. If the heating is carried to the temperature of the melting point of the dihydroxybenzene, the phenomenon of the grains sticking together occurs and hence heating to that extent should also be avoided. Of course, in any event heating to a temperature higher than necessary is uneconomical.

The same temperatures may be employed when using the dihydroxybenzenes other than catechol, the only difference being that it takes slightly longer for the additive to be taken up by the superpolyamide. For this reason, it may be preferred to employ temperatures about 5 to 10 centigrade degrees higher than when using catechol.

The dihydroxybenzene (hydroquinone, resorcinol and, preferably, catechol) may be employed for treating grains of any high molecular weight synthetic linear superpolyamide prepared in any desired manner, it being understood that the precise nature and manner of preparation of the latter forms no part of the present invention. Suitable superpolyamides that may be mentioned by way of example are condensation products of long chain aliphatic diamines and long chain aliphatic diacids (e.g., nylon 66 from hexamethylene diamine and adipic acid) and polycondensation products from monomeric organic lactams having at least six carbon atoms (e.g., nylon 6 from caprolactam).

The ratio of the dihydroxybenzene additive to the superpolyamide may be varied over a fairly wide range without departing from the spirit of the invention. Suitable ratios are from about 0.5 to 2.5%, based on the weight of the granular superpolyamide, and especially desirable results are obtained when that ratio varies from about 1 to 2%.

The size of the superpolyamide grains may vary over a rather wide range. Very good results are obtained with grains of cylindrical form, the diameter of the cylinder being about equal to the length. Thus, grains having a length of 3 mm. cut from a superpolyamide monofil of 3 mm. diameter are suitably employed. In some cases even better results are obtained with superpolyamide grains 1.5 mm. long cut from a monofil of 1.5 mm. diameter, the mixing of the powdered catechol or other dihydroxybenzene and the dispersion thereof throughout the superpolyamide being in that case exceptionally good.

While specific details of preferred methods and compositions according to the present invention have been set forth above, it will be apparent that many changes and modifications may be made therein without departing from the spirit of the invention. It will therefore be

What is claimed is:

1. A method for preparing an extrusion material suitable for processing to threads and other shaped objects, comprising mixing grains of synthetic linear superpolyamide with from about 0.5% to 2.5% by weight of a dihydroxybenzene, selected from the group consisting of hydroquinone, resorcinol and catechol, and heating the mixture during mixing to a temperature below the melting point of the dihydroxybenzene, but higher than 50° C. for a period of time sufficient to effect infiltration of the dihydroxybenzene into the interior of said grains, while maintaining said superpolyamide in substantially granular form.

2. A method as defined in claim 1, in which catechol is used as the dihydroxybenzene, and in which the mixture is heated during mixing to about 70° C.

3. A method as defined in claim 1 in which the superpolyamide is a polymer of epsilon-caprolactam.

References Cited in the file of this patent

UNITED STATES PATENTS

| | | |
|---|---|---|
| 2,388,676 | Coffman et al. | Nov. 13, 1945 |
| 2,424,885 | Buist et al. | July 29, 1947 |
| 2,568,894 | Mackay | Sept. 25, 1951 |
| 2,662,061 | Gilcrease et al. | Dec. 8, 1953 |
| 2,670,340 | Kehe | Feb. 23, 1954 |
| 2,705,227 | Stamatoff | Mar. 29, 1955 |

OTHER REFERENCES

"Elastomers and Plastomers," Houwink, Elsevier Publishing Co., N.Y. (1949), vol. II, page 318. (Copy in Div. 60.)